US008660852B2

(12) United States Patent
Law

(10) Patent No.: US 8,660,852 B2
(45) Date of Patent: *Feb. 25, 2014

(54) CRM OFFICE DOCUMENT INTEGRATION

(75) Inventor: Veronica Y. Law, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 2374 days.

This patent is subject to a terminal disclaimer.

(21) Appl. No.: 11/069,217

(22) Filed: Feb. 28, 2005

(65) Prior Publication Data
US 2006/0212299 A1   Sep. 21, 2006

(51) Int. Cl.
G06Q 10/00   (2012.01)

(52) U.S. Cl.
USPC .............................. 705/1.1; 705/345; 705/342

(58) Field of Classification Search
None
See application file for complete search history.

(56) References Cited

U.S. PATENT DOCUMENTS

| | | | | |
|---|---|---|---|---|
| 6,067,551 A * | 5/2000 | Brown et al. | ........................ | 1/1 |
| 6,157,927 A * | 12/2000 | Schaefer et al. | ........................ | 1/1 |
| 6,199,079 B1 * | 3/2001 | Gupta et al. | ........................ | 715/207 |
| 6,292,830 B1 * | 9/2001 | Taylor et al. | ........................ | 709/224 |
| 6,295,536 B1 * | 9/2001 | Sanne | ........................ | 1/1 |
| 6,377,965 B1 * | 4/2002 | Hachamovitch et al. | ..... | 715/203 |
| 6,421,678 B2 * | 7/2002 | Smiga et al. | ........................ | 707/608 |
| 6,671,689 B2 * | 12/2003 | Papierniak | ........................ | 1/1 |
| 6,732,092 B2 * | 5/2004 | Lucas et al. | ........................ | 707/706 |
| 6,757,689 B2 * | 6/2004 | Battas et al. | ........................ | 1/1 |
| 6,804,330 B1 * | 10/2004 | Jones et al. | ........................ | 379/88.01 |
| 6,832,224 B2 * | 12/2004 | Gilmour | ........................ | 1/1 |
| 6,952,805 B1 * | 10/2005 | Tafoya et al. | ........................ | 715/739 |
| 6,954,757 B2 * | 10/2005 | Zargham et al. | ........................ | 1/1 |
| 6,963,826 B2 * | 11/2005 | Hanaman et al. | ........................ | 703/2 |
| 6,965,920 B2 * | 11/2005 | Pedersen | ........................ | 709/206 |
| 6,976,269 B1 * | 12/2005 | Avery et al. | ........................ | 726/2 |
| 7,031,437 B1 * | 4/2006 | Parsons et al. | ........................ | 379/88.12 |
| 7,213,013 B1 * | 5/2007 | Subramania et al. | ........................ | 707/3 |
| 7,366,460 B2 * | 4/2008 | O'Farrell et al. | ........................ | 455/3.06 |
| 7,447,699 B2 * | 11/2008 | Alexander et al. | ........................ | 1/1 |
| 7,546,359 B2 * | 6/2009 | Tierney et al. | ........................ | 709/223 |
| 2002/0055956 A1 * | 5/2002 | Krasnoiarov et al. | ........................ | 707/513 |
| 2002/0133392 A1 * | 9/2002 | Angel et al. | ........................ | 705/10 |
| 2002/0152210 A1 * | 10/2002 | Johnson et al. | ........................ | 707/9 |
| 2002/0156812 A1 * | 10/2002 | Krasnoiarov et al. | ........................ | 707/513 |
| 2003/0009536 A1 * | 1/2003 | Henderson et al. | ........................ | 709/219 |
| 2003/0074418 A1 * | 4/2003 | Coker | ........................ | 709/217 |
| 2003/0084127 A1 * | 5/2003 | Budhiraja et al. | ........................ | 709/220 |
| 2003/0105887 A1 * | 6/2003 | Cox et al. | ........................ | 709/328 |
| 2003/0140058 A1 * | 7/2003 | Martin et al. | ........................ | 707/103 R |

(Continued)

OTHER PUBLICATIONS www.infoworld.com; "Coming Together, Collaboration is gearing up with XML integration, peer-to-peer, and email delivery, as it tries to shift the balance toward user acceptance and ROI"; By Stephanie Sanborn and Cathleen Moore; Dec. 10, 2001; p. 36-38.*

(Continued)

Primary Examiner — Matthew L. Brooks
(74) Attorney, Agent, or Firm — Damon Reith; Brian Haslam; Micky Minhas

(57) ABSTRACT

The method and system claimed recognizes phrases or segments within an electronic document, where the phrase or segment acts to trigger a function call to a sever component that connects to a CRM system or a CRM database and retrieves relevant information relating to and based on the recognized phrase. Further, the relevant information is formatted and displayed based on the content of the information retrieved and the context and content of the identified phrase.

6 Claims, 9 Drawing Sheets

(56) References Cited

U.S. PATENT DOCUMENTS

| | | | |
|---|---|---|---|
| 2003/0163357 A1* | 8/2003 | Engleman et al. | 705/7 |
| 2003/0163547 A1* | 8/2003 | Beisty et al. | 709/217 |
| 2003/0212654 A1* | 11/2003 | Harper et al. | 707/1 |
| 2003/0236820 A1* | 12/2003 | Tierney et al. | 709/203 |
| 2004/0015366 A1* | 1/2004 | Wiseman et al. | 705/1 |
| 2004/0093397 A1* | 5/2004 | Chiroglazov et al. | 709/219 |
| 2005/0004885 A1* | 1/2005 | Pandian et al. | 707/1 |
| 2005/0060371 A1* | 3/2005 | Cohen et al. | 709/205 |
| 2006/0053194 A1* | 3/2006 | Schneider et al. | 709/204 |
| 2006/0075024 A1* | 4/2006 | Zircher et al. | 709/205 |
| 2006/0095476 A1* | 5/2006 | Dauer et al. | 707/200 |
| 2006/0206352 A1* | 9/2006 | Pulianda | 705/1 |
| 2007/0226032 A1* | 9/2007 | White et al. | 705/9 |
| 2008/0148368 A1* | 6/2008 | Zurko et al. | 726/5 |

OTHER PUBLICATIONS www.infoworld.com; "IM scales corporate ladder"; by Cathleen Moore; Jul. 16, 2001; p. 17-18.* www.infoworld.com; Create working offices on the Web; Web ; May 21, 2001; p. 80.*

NetworkWorld, The Buzz Issue; "Real-time collaboration-for real!"; By Christine Perey; Sep. 29, 2003; p. 60.*

* cited by examiner

CRM OFFICE DOCUMENT INTEGRATION

FIELD OF THE INVENTION

The present invention generally relates to a method and system of accessing information in a customer relationship management system based on identifying phrases within an electronic document that are associated with information stored in the customer relationship management system and displaying the information based on the content or context of the identified reference.

BACKGROUND

Information workers typically work with desktop tools involving e-mail messages, documents, spreadsheets, and forms that refer to customer information. Unfortunately, there is a deep divide between customer relationship management ("CRM") systems used to collect and manage data on customers, and the desktop tools that information workers use to communicate and act on this information. This division is an unnecessary barrier between the documents that talk about business information (for example, e-mails or word processing documents between customers and a company) and the information itself (for example, the customer record or order record in the company's CRM system).

Workers may have to leave their desktop documents frequently to see, explore, and act on the information in a separate CRM system. The need to switch between applications is time-consuming and disruptive. When people must collaborate around information or documents, the inefficiencies may compound as colleagues must explore the same references and discover the related information repeatedly.

Thus, there is a need to incorporate and integrate some of the basic functionality of a CRM system, or at least provide access to the data used by a CRM system, with office production tools such as a word processing application, a messaging and collaboration application, a spreadsheet program, etc.

SUMMARY

The method and system of the claims enables information workers to view and act on business data from within an electronic document using their familiar desktop programs. The method and system claimed recognizes phrases or segments within an electronic document, where the phrase or segment acts to trigger a function call to a sever component that connects to a CRM system or a CRM database and retrieves relevant information relating to and based on the recognized phrase. Further, the relevant information is formatted and displayed based on the content of the information retrieved and the context and content of the identified phrase.

The method and system of the claims enables organizations to connect their desktop programs to a CRM system and data in a cost-effective way. Using the method and system of the claims, information workers are provided relevant information and related actions within the context of performing a business process. By providing access to this information while within a document, e-mail message, spreadsheet, etc., information workers can connect content within an organization's documents to related, existing back-office CRM system data.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
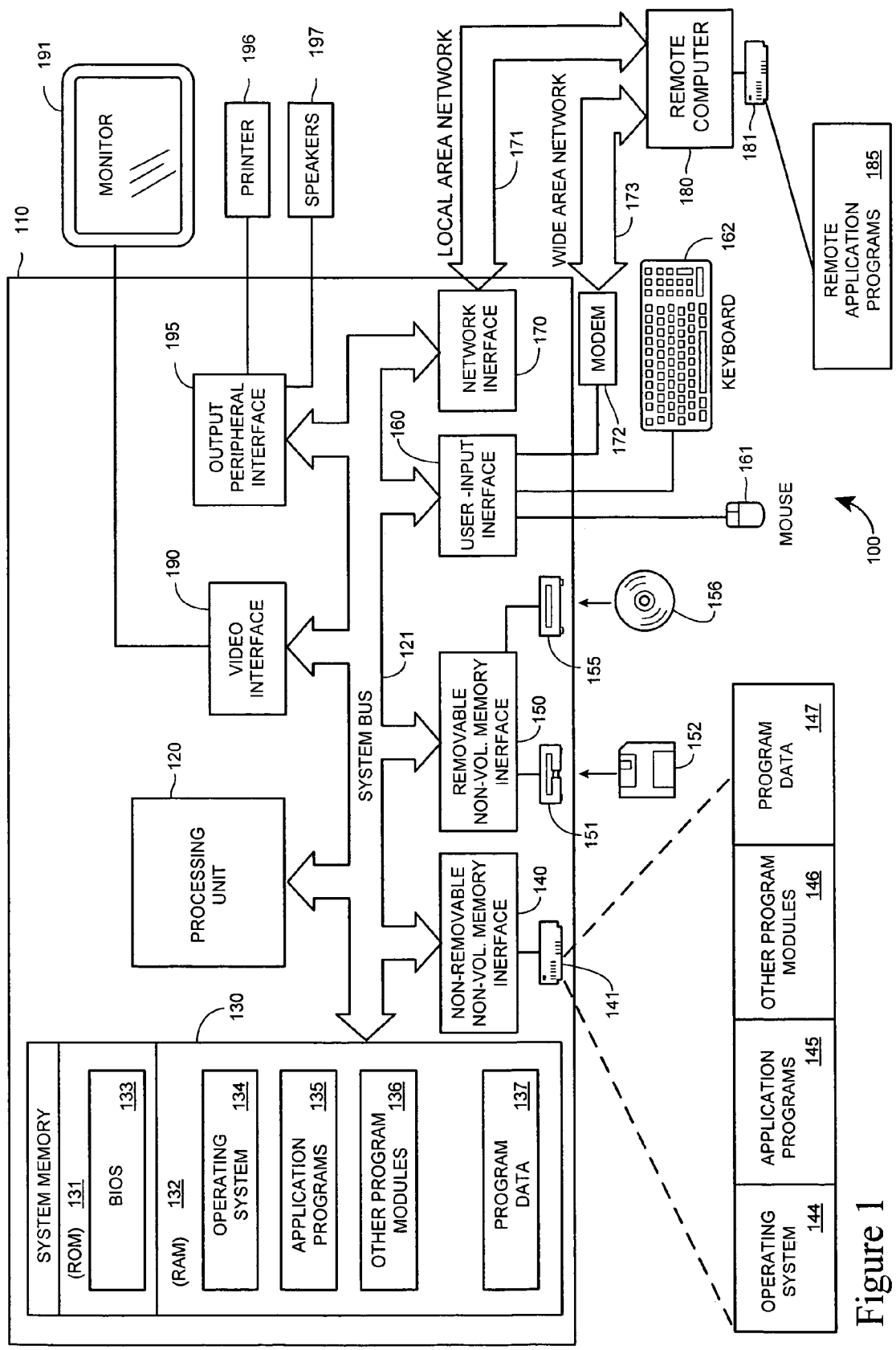
FIG. 1 illustrates a block diagram of a computing system that may operate in accordance with the claims.

FIG. 1 illustrates an example of a suitable computing system environment 100 on which a system of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus. Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or Writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The information workers who perform business functions have several common traits. They depend on e-mail, forms, and electronic documents to communicate and collaborate about the business. Moreover, they rely on data from multiple sources as input to a single decision, and after making a decision, they take actions that involve multiple enterprise applications. Many employees rely on desktop applications to capture, analyze, report on, publish, process, communicate, and collaborate on business information. These desktop applications provide a familiar, ubiquitous environment for communicating complex thoughts on business information. When information workers communicate about business matters, they may typically use a word processing application, a spreadsheet application, or a messaging and/or collaboration application.

In an enterprise setting, however, key business information typically resides in large, back-end databases and line-of-business applications. The line-of-business applications that collect and maintain enterprise data include Customer Relationship Management (CRM) systems. These CRM systems typically include databases or data warehouses, servers; and server applications that collect and manage the data, and in many cases, specialized front-end applications that enable users to interact with the data. These are powerful, specialized front-end applications that usually reflect the complexity of their back-end counterparts.

For specialists who spend most of their work time interacting with a single system—that is, the subset of information workers who execute structured business processes within a single application—the complexity of a CRM system application is not an issue. But for the majority of information workers who aren't directly involved in the creation or management of the data, but whose effectiveness depends on their ability to discover this data, these specialized systems are not very efficient.

For information workers that spend a majority of their time using desktop applications, reliance on a separate CRM system application can be a significant liability. For occasional users, these systems may be difficult to use and master, and users must switch between applications, using one set of tools to locate the required data, and then copy and paste or re-key that data into the desktop application document in which they can work with the information in a meaningful manner.

This "application hopping" introduces numerous organizational inefficiencies. It reduces productivity by forcing users to switch rapidly between applications, first learning and then applying the various commands and feature sets. In addition, the act of copying and pasting data from one application to another introduces opportunities for error. Moreover, switching applications does not enable the information worker to view the information in context. Unlike a CRM system front-end application that may provide structured views into CRM data, documents or e-mail messages typically refer to specific CRM data entities as part of a discussion or a decision or process that involves that information. Leaving the document to look up this information disrupts the flow of the decision or process. Application hopping also forces a worker to keep track of the context manually, moving between a document and the CRM application, and places a heavy burden on the worker.

Figure 2:
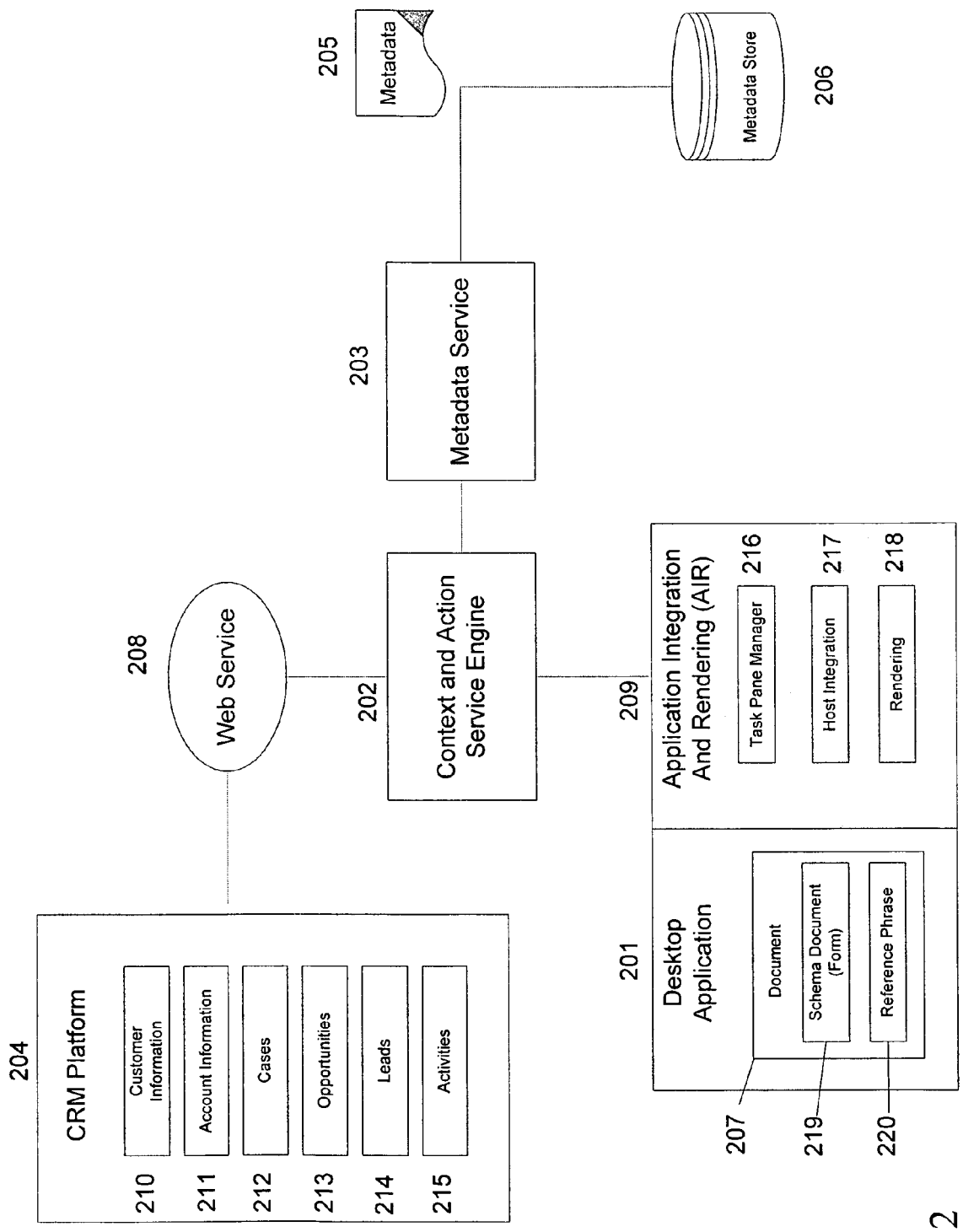
FIG. 2 illustrates an architectural view of the components of an embodiment of the claims.

FIG. 2 illustrates a component architecture for an embodiment of the claims. A desktop application 201 may run on a client machine together with a context and action service ("CAS") engine 202. Alternatively, the CAS engine may run on another physical machine coupled to the client machine. The CAS engine may communicate with a Metadata service 203 which provides instructions to the CAS engine for analyzing an electronic document associated with the desktop application, and for recognizing phrases and segments of the document which may correspond to or relate to data in a CRM system 204. These instructions may be in the form of metadata 205 that is provided by a metadata store 206. The recognition and identification of reference phrases may occur contemporaneously with the creation of a document 207, e.g., as the phrase is being inputted into the document by a user. Alternatively, a pre-identified, selectable or recognized phrase may be manually inserted into the document without first being recognized by the CAS engine. This recognized phrase may be used to initiate a call to a server component 208 (which may be a Web Service) that connects to the CRM system 204. This call may retrieve various objects of the CRM system, such as a customer, an account, a lead, etc. The initiation of a particular function of the server component may be based on a recognized association between the function and the recognized phrase. An application integration and rendering ("AIR") module 209 may collect the retrieved data from the server component. The service component may further provide the AIR module 209 with formatting information, where the formatting information may associate a view layout for the data based on the retrieved information, the context and content of the phrase, etc. The AIR module 209 may then collect the retrieved data and the formatting information and display the retrieved results in a manner consistent with the formatting data. Displaying the data may happen contemporaneously with the recognition of a phrase. Alternatively, upon recognition of the phrase, an indication that the phrase has been recognized may be given. This indication may provide a user an option to select the phrase. Upon selection of the phrase, a list of action options for retrieving further information may be displayed, or alternatively a set of retrieved information may be automatically displayed without selection.

The CRM system may have several objects and functions. The server component may only access a portion of the CRM system objects and functions. As illustrated in FIG. 2, a set of CRM objects may include a customer 210, an account 211, a case 212, an opportunity 213, a lead 214, and an activity 215 object.

The AIR module may include a task pane manager 216 for controlling a task pane object (not shown) that displays retrieved information from the server component. The AIR module may also comprise a host integration component 217 for interfacing a particular desktop application with the CAS engine and a rendering component 218 for communicating with the desktop application. The desktop application 201 may manage the creation of a document 207. The document 207 may be analyzed by the CAS engine through an underlying schema 219 of the document or through reference phrases 220, as discussed above. A document schema may be embedded with the document text using XML that demarcates different sections of the document, e.g., a form with several parts.

Figure 3:
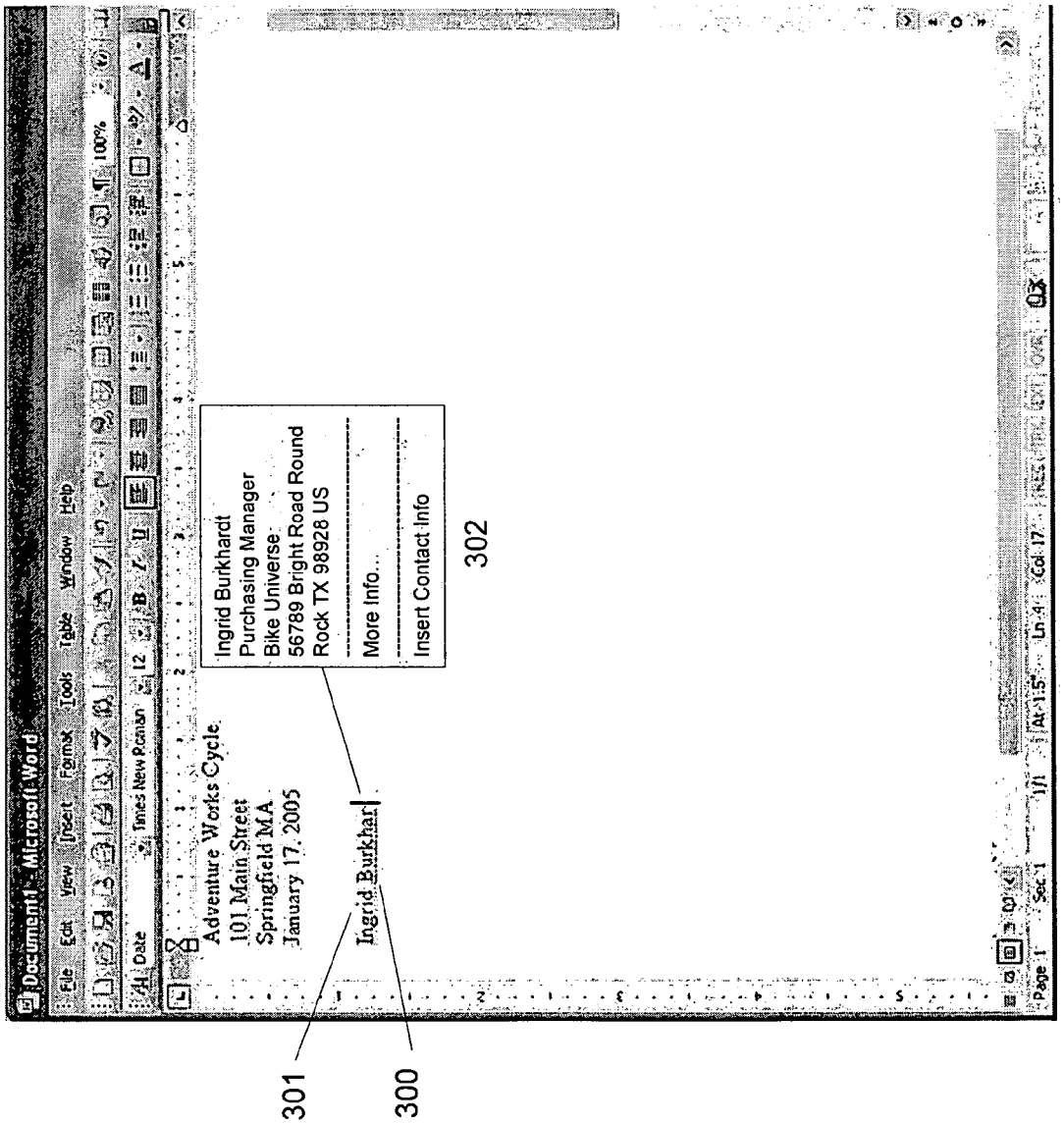
FIG. 3 illustrates a reference tag embodiment of the claims.

In an embodiment illustrated in FIG. 3, an indicator takes the form of an underline highlight 300 of the phrase 301. Options 302 may be displayed by selecting the highlighted and recognized phrase.

Figure 4:
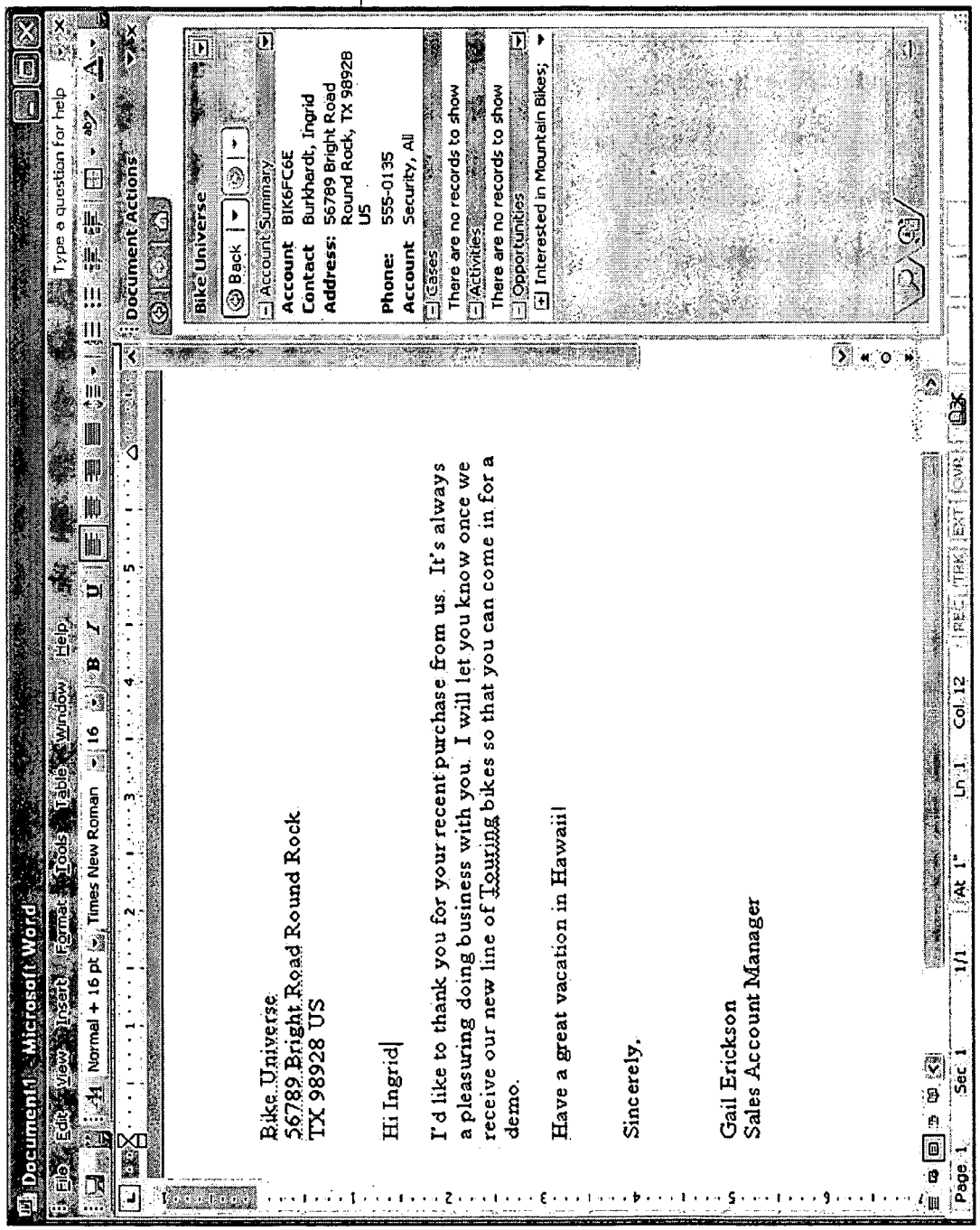
FIG. 4 illustrates a task pane embodiment of the claims.

In one embodiment of the claims illustrated in FIG. 4, a task pane object 401 may display information based on a recognized phrase as the phrase is being inputted, thereby acting as an indicator. While the task pane may be used to provide a manual search option for obtaining CRM information independent of the document, a manual search through the task pane may be automatically filtered based on the content and/or context of portions of the document. For example, if the portion of the document relates to customer opportunities, the CAS engine may recognize this and help to refine a manual search by passing along context and content information to the server component along with manually inputted search terms.

Figure 5:
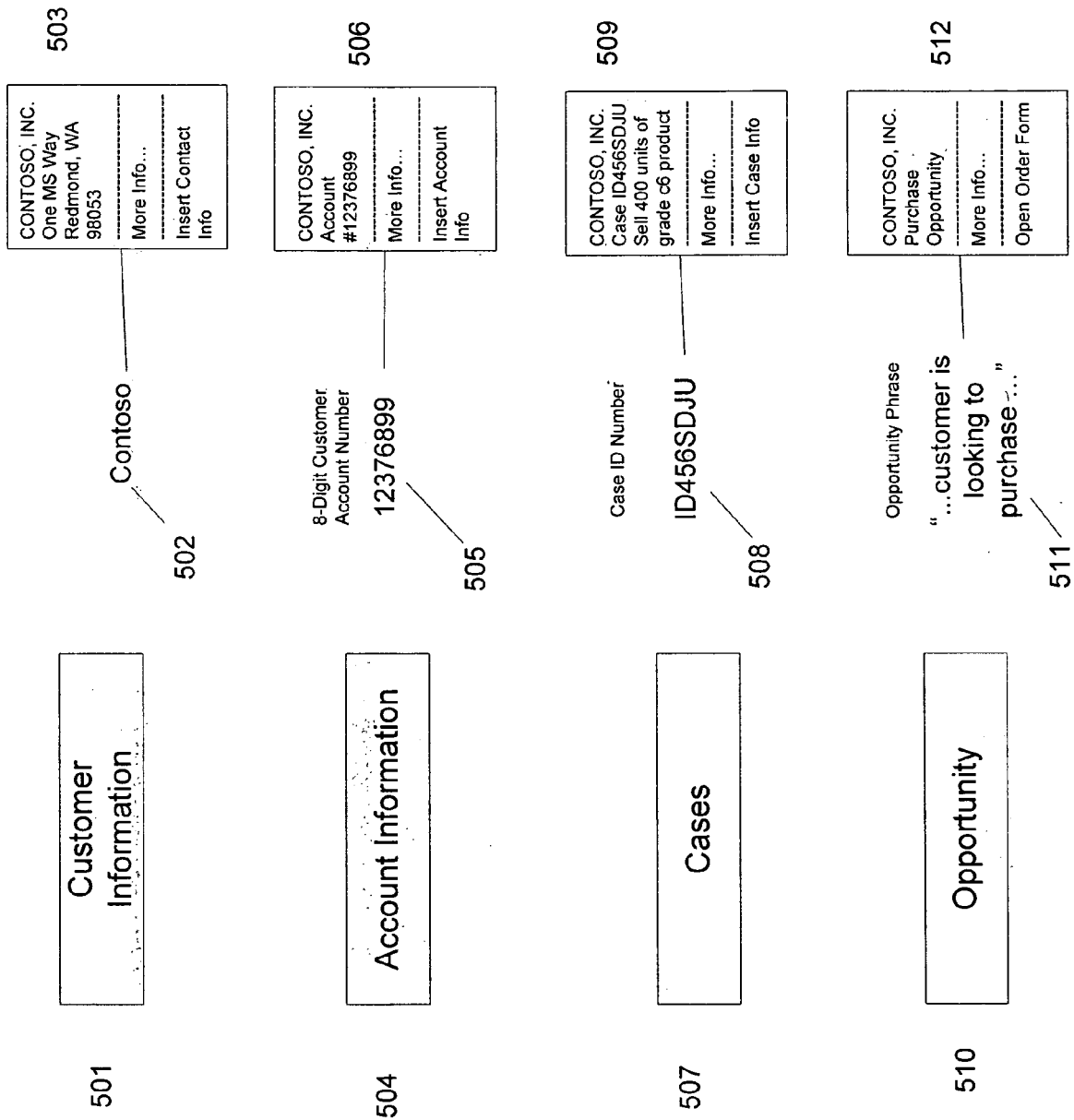
FIG. 5 illustrates an example of CRM type recognizers.

FIG. 5, illustrates a list of some CRM specific recognizers relating to CRM business objects that may be programmed into the CAS engine. Recognizers are used to instruct the CAS engine to identify the phrases that relate to CRM data. FIG. 5 illustrates that a recognizer 501 may be used to identify a customer name 502 which is then associated with a customer business object 503 of the CRM system. An account number recognizer 504 may look for a particular string of digits associated with an account number 505 for an account object 506. A case recognizer 507 may look for an alphanumeric string representing a case ID number 508 for a case object 509. In certain situations, it may be appropriate to create recognizers for leads, activities and opportunities. For example, an opportunity recognizer 510 may be based on a phrase such as " . . . client is looking to purchase . . . " 511 that describes an opportunity to sell products. This phrase may correspond to an opportunity object 512. While not illustrated, recognizers for leads, activities, and other CRM objects may be based on corresponding phrases for those objects.

Server component functions may correspond to a set of related CRM functions in which the server component functions simply wrap CRM functions, or intelligently call a group of CRM functions to accomplish an objective. The CRM application functions may, in turn, initiate data communication with a database management system ("DBMS") to access a CRM database. Alternatively, some functions may be programmed to completely bypass the CRM system altogether and connect directly to a DBMS to access the CRM system database. The server component may be a Web service component.

Figure 6:
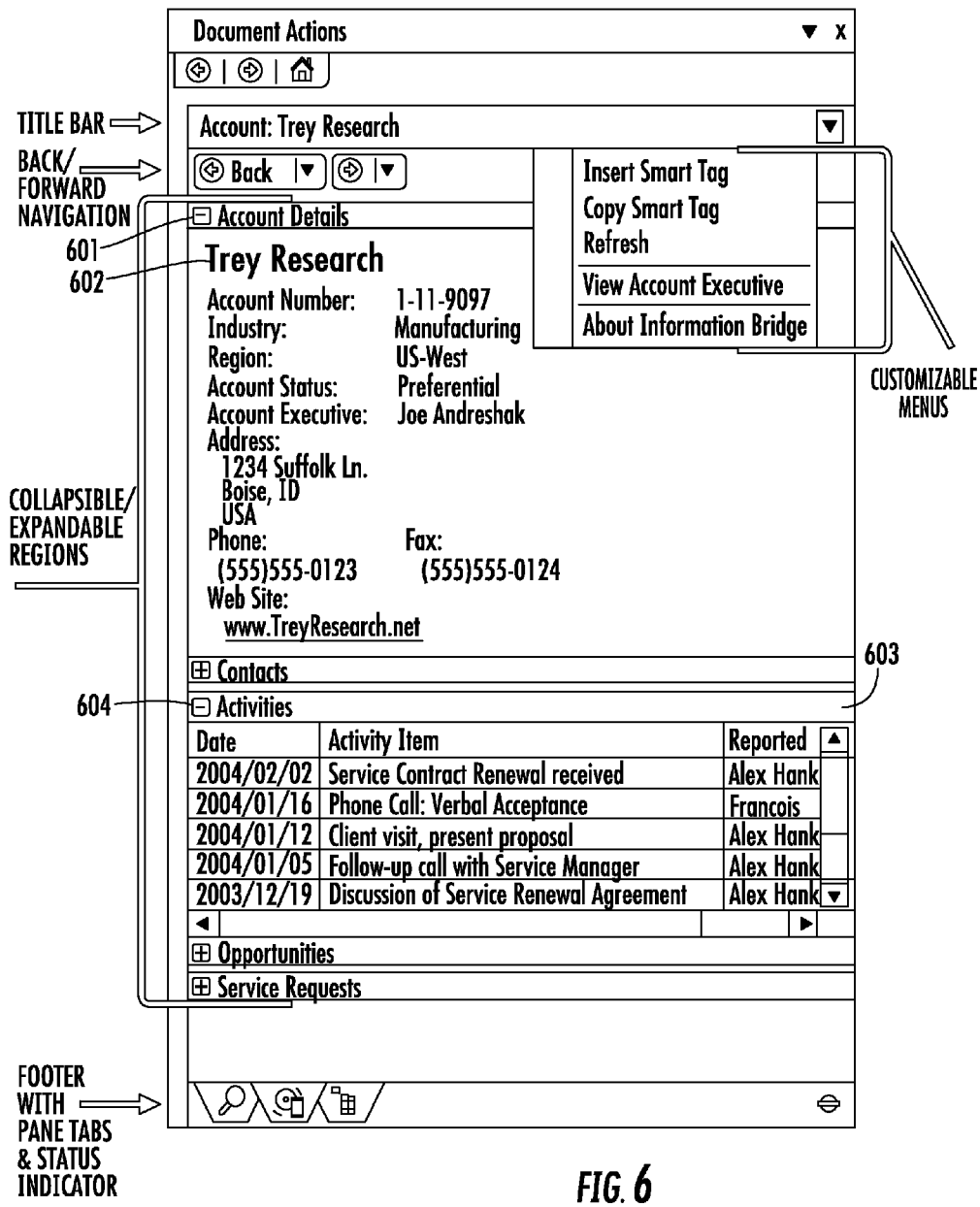
FIG. 6 illustrates a task pane prioritizing data based on formatting instructions.

FIG. 6 further illustrates that the data retrieved from a server component function may be displayed in a particular format depending on the content of the retrieved data and the context/content of the recognized phrase used to initiate the server component function. In FIG. 6, for example, the information for a particular account 601 is shown where the customer information 602 is highlighted and made prominent while other data 603 is shown ancillary to the customer information. Also, in cases in which a user is reporting on an activity(s) through an e-mail document relating to a status report, information in the ancillary portion may change to highlight relevant information. For example, activity information 604 may be open, while other account related information is minimized. The presentation of the information may be based on using formatting instructions communicated to the task pane or other display device. The formatting instructions may be generated by the server component, the CAS engine, AIR module, or even by the display object itself.

Figure 7:
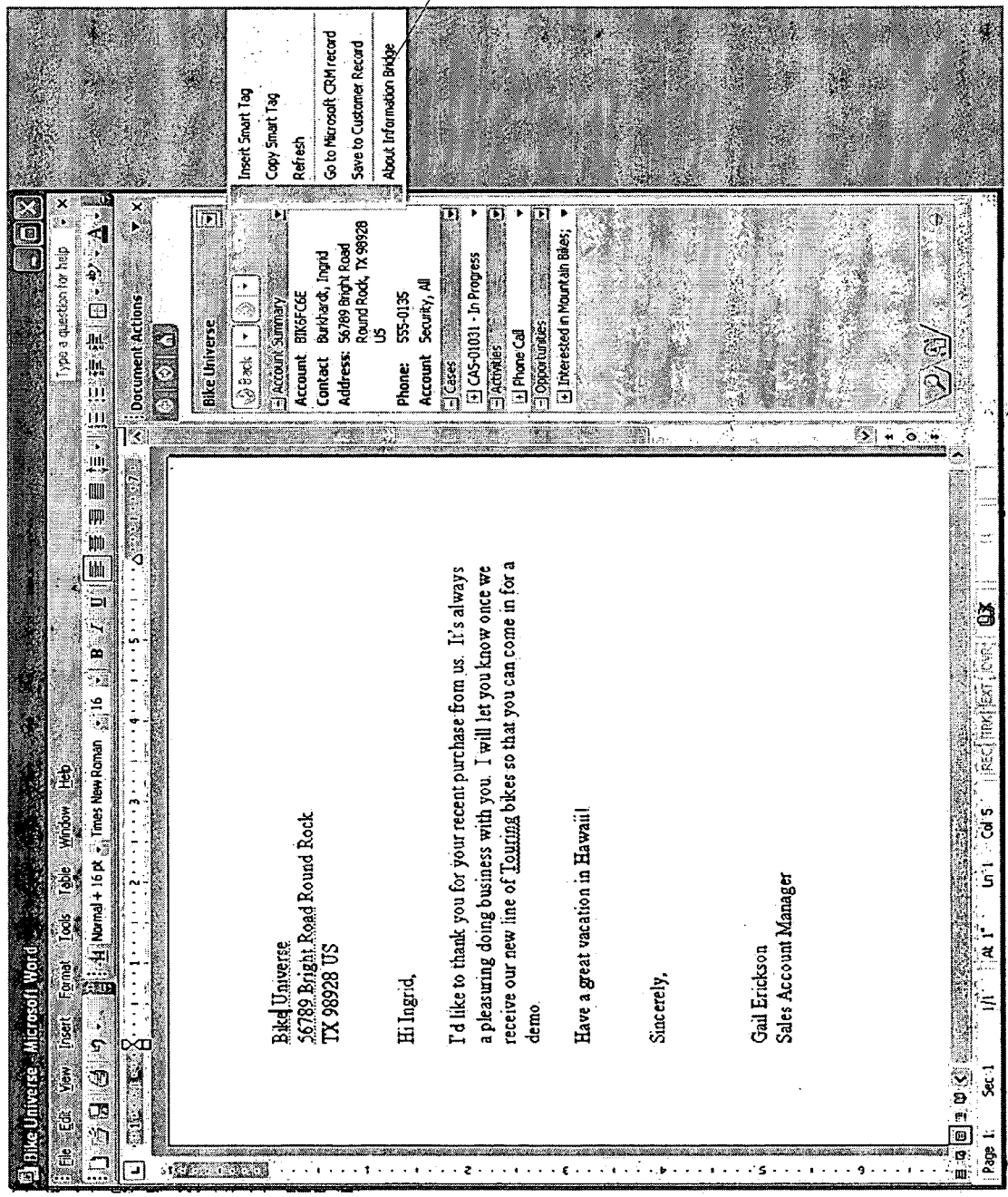
FIG. 7 illustrates an update function for saving a document for an embodiment of the claims.
Figure 9:
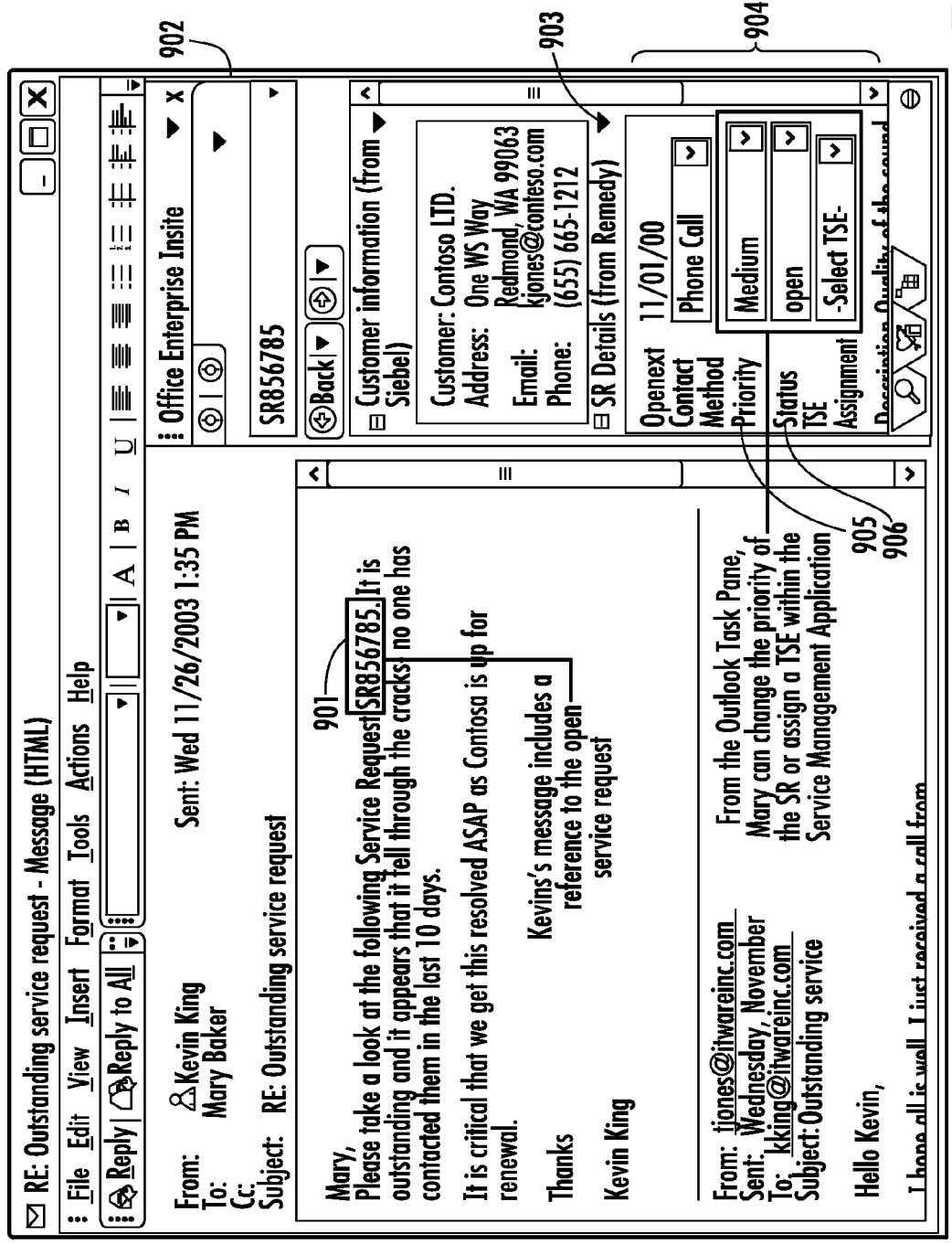

In another embodiment of the claims illustrated in FIG. 7, the AIR module may provide an option to the user for modifying the contents of the displayed/retrieved results. In this case, the modified data may be saved back to the CRM system and/or CRM system database using an update function 701, which may also be programmed into the server component (in FIG. 7, the newly created document itself may be saved to the database with an association to a customer or account). Because the retrieved data may reflect information stored in the CRM database, as well as CRM system state variables, the saved data may make a change to both CRM system and CRM database or just to one or the other. FIG. 9 illustrates an updateable priority field 905. If this field is based on information in a CRM database table, the CRM database table may be modified using an update function initiated by the server component. Alternatively, in FIG. 9, the field relating to an activity's status 906, e.g., open or completed, may be a state variable of the CRM application itself, in which case an update function may be called by the server component that does not involve an immediate database update.

In another embodiment of the claims, the query function is further based upon the identity of the user. This may be established using an ID and password that is authenticated by an operating system running on the client computer, or in addition, a network server and network directory service, such as Microsoft Windows NT and Microsoft's Active Directory. This information, may be passed, along with the phrase context and content information, to the server component. Further, the web service component may initiate a logon to the CRM system or to a Database Management System ("DBMS") before running a query. In this case, a failed logon attempt may result in an empty set or a null set being returned. If a successful logon is performed based on the client/user credentials, then the query may retrieve information based on the client credentials, e.g., by using a WHERE clause that filters the data based on identifiers within the data entity relating to access rights. General role-based security may also be implemented.

The following is a description of a business process scenario which may be improved by using an embodiment of the claimed system.

Terry Jones, an Account Executive at the Litware Corporation, discovers that the Contoso Company, one of her primary accounts, has an outstanding service request that is more than 10 days old. Terry composes an e-mail message to Kevin King, the Customer Service Manager, asking him to look into the delay and resolve the issue.

When he reads Terry's note, Kevin logs on to the Litware's CRM system and pulls up information about the Contoso account. He checks the customer contact and retrieves a list of Contoso's top five customer activities. Looking at the recent activities, Kevin can see that one of Contoso's recent service requests has been closed, but he has no way of knowing if this is the service request that Terry is concerned about. Kevin then must perform a more detailed search of the customer records using the complex CRM system and upon scanning the open service requests, notices that Contoso does indeed have an open service request that has been outstanding for 10 days. The service request has slipped through the cracks.

Kevin decides to alert Mary Baker, Litware's Director of Product Engineering, about the issue. Kevin adds his comments to Terry's e-mail message, copies relevant information from the CRM system, and then forwards the message to Mary. When Mary receives Kevin's message, Mary logs into the CRM system herself to get some background on the Contoso account. She decides to escalate the outstanding service request, and she wants a senior engineer to take responsibility. Because she is not very familiar with Litware's CRM system, Mary calls Kevin and asks him to change the priority of the Contoso service request and see that it is assigned appropriately. Kevin talks Mary through the steps necessary to escalate the request, and when then finally completes the task. Kevin closes the loop by sending an e-mail message to Terry, informing her of the status and the reassignment of the service request. Although the process begins and ends with the exchange of e-mail messages in Outlook, a significant portion of Terry, Kevin, and Mary's time is spent in a separate CRM, application, looking up related information, before returning to Outlook.

Figure 8:
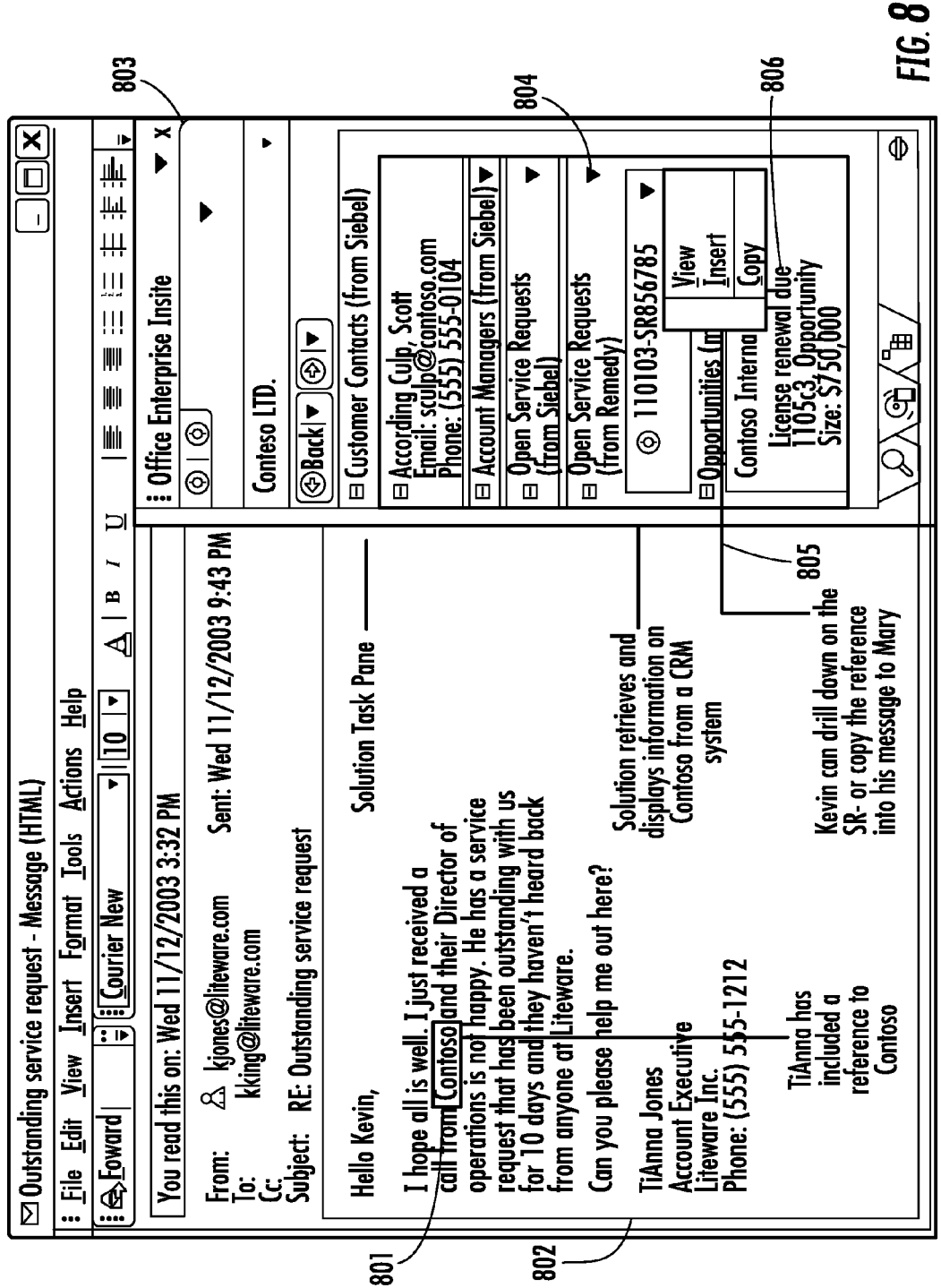
FIGS. 8-9 illustrates screen shots demonstrating views displayed to a user for an embodiment of the claims.

FIGS. 8 and 9 illustrates the same business situation described above, except using an embodiment of the claimed system.

FIG. 8 illustrates a screen where, Terry, the account executive who initiates the investigation, begins composing her email. As Terry composes her message certain phrases 801, 802 associated with the Contoso account are automatically recognized and highlighted. As Terry is typing the message, she has the option to insert a reference for each recognized CRM business entity in the message (e.g., the customer name, service request, and the terms of the customer's service agreement). Rather than detailing all her concerns in the message, Terry retrieves information about Contoso's recent activity using retrieved information in the task pane 803, and then inserts references to the specific service request 804.

When Kevin and Mary receive Terry's message, they do not have to leave the desktop application to research and resolve the situation. Within the body of the e-mail message, the references inserted by Terry present a list of relevant actions for those business objects. For example, Kevin may click a "Show customer summary" option (not shown) on the highlighted "Contoso" reference in the message body, the task pane 803 may display customer information retrieved from the CRM system. Rather than examining the data in an ad hoc fashion, as when Kevin explored the CRM system on his own, the claimed system allows a systematic approach, prioritizing information in the task pane 803 that may be relevant to the issues Kevin must consider. In the case of CRM information, the solution may retrieve not only the account contact information and recent activities, but also a view into any upcoming opportunities 805 involving the recognized customer. On examining the opportunities around the Contoso account, Kevin discovers that there is a $750,000 license renewal 806 coming up (information he might easily have missed during his own ad hoc exploration of the CRM system). Based on this information, Kevin decides to escalate the issue to Mary immediately. Kevin adds his comments to Terry's e-mail message, inserts a reference to the service request, and then forwards the message to Mary.

As shown in FIG. 9, when Mary receives Kevin's message, Mary can explore the circumstances of the upcoming opportunity and identify the parties involved on each side. Similarly, when Mary clicks the reference to the service request 901, the task pane 902 displays the status and details 903 from the CRM system, and a list of possible actions 904, including the option to change the priority 905 and assign the request to a specific engineer. Kevin and Mary may research the issue, make an informed decision, and take the appropriate actions without ever leaving the e-mail message. In fact, neither Kevin nor Mary may need to know where to find the customer data or how to query the complex CRM system.

The method and system of the claims may enable desktop application documents to be enriched with information from a CRM System, providing context for making better decisions faster. When using the system of the claims, information workers may not have to manually move or copy data between programs but may establish links between the company's enterprise data stores and their desktop documents, which may include spreadsheets, word processing documents, e-mail messages, and electronic forms. Moreover, these links may be created automatically and contemporaneously with the creation of the content in the document, where an engine recognizes phrases and associates these phrases with retrievable CRM data. A user may also choose to incorporate manual references within the documents to serve as a direct link to CRM system functions that readers can act on within the document to make and implement decisions.

The claimed system may reduce costs associated with information discovery and integration. The claimed system may enable information workers to aggregate and act on interrelated information from a CRM system while within the context of a document. This may eliminate manual information gathering and may reduce the burden on specialists called upon to extract data or prepare reports from the CRM system.

The claimed system may improve collaboration and decision making processes by enabling a wide subset of information workers to communicate critical information regarding CRM information with up-to-date data from a CRM system. This may dramatically improve the efficiency of communication by eliminating the effort required to recreate the context for the communication. Because documents may include live, direct links to the a CRM application or database, all participants in a decision have access to a current, consistent view of that information.

The claimed system may increase the ease of use of information from CRM systems by eliminating the need for information workers to learn and operate multiple, complex CRM applications. Workers may perform a greater portion of their daily tasks and initiate business processes from within the familiar, comfortable desktop environment.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A computer system comprising:
  a customer relationship management system having a customer relationship management database;
  a database management system comprising a set of databases, wherein at least one of the databases is the customer relationship management database;
  a web service component communicatively coupled to the customer relationship management system;
  a document application associated with an electronic document;
  a content and action service communicatively coupled to the web service component and the document application, that identifies a recognized phrase in the electronic document and calls a function of the web service component after identifying the recognized phrase, based on a recognized association between the web service component function and the recognized phrase;

an application integration and rendering module communicatively coupled to the context and action service and the document application, that collects data resulting from calling the web service component function and displays the data based on formatting instructions, wherein the data resulting from calling the web service component is displayed in a task pane simultaneously with the electronic document, and the formatting instructions are based on a context and content of the recognized phrase; and a processor operable to implement one or more of the customer relationship management system, the database management system, the web service component, the document application, the content and action service, or the application integration and rendering module.

2. The computer system of claim 1, wherein the content and action service identifies the recognized phrase based on an underlying XML markup schema.

3. The computer system of claim 1, further comprising a network operating system, wherein the web service component function utilizes a security feature of the network operating system to authenticate a user of the document application, and further wherein the web service component function is based on a user ID.

4. The computer system of claim 1, wherein the formatting instructions are based on the content of the data.

5. The computer system of claim 1, wherein the web service component communicates directly with the database management system to retrieve information from the customer relationship management database.

6. The computer system of claim 1, wherein the document application is one of a word processing application, a messaging and collaboration application, and a spreadsheet application.

* * * * *